3,535,377
N-BUTYN-(1)-YL-(3)-ANILIDES AS HERBICIDES
Gustav Steinbrunn, Schwegenheim, Pfalz, Erich Flickinger, Frankweiler, Pfalz, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Nov. 21, 1966, Ser. No. 595,650
Claims priority, application Germany, Dec. 24, 1965, 1,542,702
Int. Cl. C07c 103/30
U.S. Cl. 260—562           4 Claims

ABSTRACT OF THE DISCLOSURE

A herbicidal compound of the formula

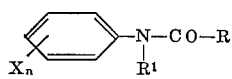

wherein X is hydrogen, thiocyano, halogen, nitro, trifluoromethyl or lower alkyl, $n$ being an integer of 1 to 3, R represents lower alkyl, chloro-substituted lower alkyl or bromo-substituted lower alkyl, and $R^1$ represents 1-butynyl.

---

The present invention relates to new substituted acid anilides. In particular it relates to acid anilides which are derived from N-substituted anilides. The invention also relates to a method of controlling unwanted vegetation with said compounds. It relates particularly to the control of unwanted plants in crops without damaging the crops.

It is known that chloroacetic N-isopropylanilide may be used as the active ingredient of a herbicide (French patent specification 1,339,002).

We have found that substituted acid anilides having the formula

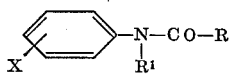

in which X denotes hydrogen, thiocyano, chlorine, bromine, fluorine, the nitro group or a trifluoromethyl or alkyl radical having one to three carbon atoms, R denotes an aliphatic radical having one to three carbon atoms which may be substituted by chlorine or bromine and $R^1$ denotes an alkyl radical having one to three carbon atoms which is substituted by hydroxy, cyano or the —CH$_2$—CS—NH$_2$ or

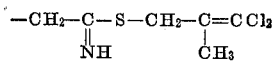

radical or an alkynyl radical having four carbon atoms, have a good herbicidal action.

The anilides to be used according to the present invention may be simply prepared for example by reacting unsubstituted or substituted N-butyn-(1)-yl-(3)-anilines with acid chlorides. The N-butyn-(1)-yl-(3)-anilines can be easily obtained for example from 3-chlorobutyne-(1) and aniline.

Since all the other compounds to be used according to the invention may be prepared by analogous methods, the production of chloroacetic-N-butyn-(1)-yl-(3) anilide is described below in more detail.

16 parts by weight of sodium bicarbonate is added to 80 parts by weight of anhydrous toluene and 22 parts by weight of N-butyn-(1)-yl-(3) aniline which has been prepared in a conventional way from 3-chlorobutyne-(1) or butyn-(1)-yl-(3) alkyl sulfonates or butyn-(1)-yl-(3) aryl sulfonates and aniline. 17 parts by weight of chloroacetyl chloride is added to this mixture at 25° to 35° C. while stirring. After the acid chloride has been added, the mixture is kept at 35° to 40° C. for two hours. Water is then added, the two layers are separated in a separating funnel, the organic layer is washed with water until free of chloride, and the solvent is removed in vacuo. The residue is 38 parts by weight of a syrup. The product is dissolved in diisopropyl ether, the solution is suction filtered and the filtrate is again evaporated in vacuo. 35 parts by weight of chloroacetic N-butyn-(1)-yl-(3) anilide is obtained having a melting point of 40° to 41° C.

The compound has the following structural formula:

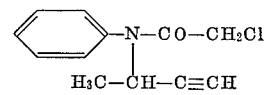

Examples of substituted anilines which are suitable for the production of the active ingredients are o-toluidines, m-toluidines, p-toluidines, xylidines, m-chloroanilines, m-bromoanilines, p-chloroanilines, p-bromoanilines, 3,4-dichloroanilines, 3,4-dibromoanilines, 2,4,5-trichloroanilines, 3,4,5-trichloroanilines, 4-bromo-3-chloroanilines, 4-chloro-3-bromoanilines, halogenated toluidines and xylidines.

Examples of acid chlorides which may be used are acetic, propionic, butyric and isobutyric chlorides and their chlorine and bromine derivatives.

The following compounds are suitable as agents for regulating plant growth according to the invention:

Chloroacetic N-butyn-(1)-yl-(3) m-chloroanilide
Chloroacetic N-butyn-(1)-yl-(3) p-chloroanilide
Chloroacetic N-butyn-(1)-yl-(3) p-bromoanilide
Chloroacetic N-butyn-(1)-yl-(3) m-trifluoromethyl anilide
Chloroacetic N-butyn-(1)-yl-(3) m-toluidide
Chloroacetic N-butyn-(1)-yl-(3) 3'5'-xylenide
Dichloroacetic N-butyn-(1)-yl-(3) anilide M.P. 60° to 61° C.
Dichloroacetic N-butyn-(1)-yl-(3) 2'4'5'-trichloroanilide
Dichloroacetic N-butyn-(1)-yl-(3) m-chloroanilide
α-Chloropropionic N-butyn-(1)-yl-(3) anilide
α,α-Dichloropropionic N-butyn-(1)-yl-(3) p-bromoanilide
α,α-Dichlorobutyric N-butyn(1)-yl-(3) 3'-chloro-4'-bromoanilide
α-Chloroisobutyric N-butyn-(1)-yl-(3) 4'-chloro-3'-methyl anilide
Chloroacetic N-butyn-(1)-yl-(3) p-fluoroanilide
Chloroacetic N-butyn-(1)-yl-(3) p-isopropylanilide
Chloroacetic N-butyn-(1)-yl-(3) 2'-chloro-3'-toluidide
Trichloroacrylic N-butyn-(1)-yl-(3) anilide M.P. 70° to 72° C.
Trichloroacetic N-butyn-(1)-yl-(3) anilide M.P. 62° C.

The agents for regulating plant growth according to this invention may be used as solutions, emulsions, suspensions or dusts. The form of application depend entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The following comparative experiments demonstrate the superiority of the compositions according to this invention over known active ingredients.

EXAMPLE 1

In a greenhouse plastics pots with a diameter of 8 cm. are filled with sandy soil and seeds of cabbage (*Brassicaria oleracea capitata*), cotton (*Gossypium sp.*), peas (*Pisum sativum*), onions (*allium cepa*), wild oats (*Avena fatua*), slender foxtail (*Alopecurus myosuroides*), annual meadow grass (*Poa annua*), sliky bent grass (*Apera spica venti*) and orchard grass (*Dactylis glomerata*) are sown therein. Immediately afterwards the pots are treated with chloroacetic N-butyn-(1)-yl-(3) anilide (I) and, for comparison, with chloroacetic N-isopropylanilide (II), each at a rate of application of 5 kg. of acetive ingredient per hectare, dispersed in 500 liters of water per hectare. The active ingredients were then worked into the surface of the experimental pots to a depth of 3 to 4 cm. The results of the experiment 5 weeks later can be seen from the following table.

|  | Active ingredient | |
|---|---|---|
|  | I | II |
| Crop plants: |  |  |
| Cabbage | 0 | 0 |
| Cotton | 0 | 0 |
| Peas | 0 | 0 |
| Onions | 0 | 0 |
| Unwanted plants: |  |  |
| Wild oats | 90 to 100 | 80 |
| Slender foxtail | 90 to 100 | 70 to 80 |
| Annual meadow grass | 100 | 90 |
| Silky bent grass | 90 to 100 | 80 |
| Orchard grass | 90 to 100 | 70 to 80 |

0=no damage, 100=total destruction.

The same biological action is obtained if the active ingredients are sprayed on to the surface of the soil without being worked into the soil.

EXAMPLE 2

The plants cabbage (*Brassicaria oleracea capitata*), white goosefoot (*Chenopodium album*), amaranth pigweed (*Amarantus retroflexus*), chamomile (*Matricaria chamomilla*), gallant soldier (*Galinsoga parviflora*), small nettle (*Urtica urens*) and chickweed (*Stellaria media*) are treated at a growth height of 3 to 15 cm. with chloroacetic N-butyn-(1)-yl-(3) anilide (I) and, for comparison, with chloroacetic N-isopropylanilide (II). In each case the rate of application is 5 kg. of active ingredient per hectare, dispersed in 500 liters of water per hectare. Some days later it is observed that the weeds treated with compound I exhibit a stronger herbicidal action than those treated with II.

The results four weeks later can be seen from the following table.

|  | Active ingredient | |
|---|---|---|
|  | I | II |
| Crop plants: |  |  |
| Cabbage | 0 | 0 |
| Unwanted plants: |  |  |
| White goosefoot | 80 to 90 | 50 |
| Amaranth pigweed | 80 to 90 | 40 to 50 |
| Chamomile | 70 to 80 | 40 |
| Gallant soldier | 50 to 60 | 30 |
| Small nettle | 80 to 90 | 50 |
| Chickweed | 70 to 80 | 40 |

0=no damage, 100=total destruction.

After a further three weeks all the weeds treated with I and II have withered.

The following compounds have the same biological action as I in Examples 1 and 2:

Monochloroacetic N-butyn-(1)-yl-(3) p-chloroanilide
Acetic N-butyn-(1)-yl-(3) m-chloranilide
Dichloroacetic N-butyn-(1)-yl-(3) 3'4'5'-trichloroanilide
α,α-Dichloropropinonic N-butyn-(1)-yl-(3) 2'4'-dichloroanilide
Trichloroacetic N-butyn-(1)-yl-(3) 3'-chloro-4'-bromoanilide
α,α - Dichlorobutyric N - butyn - (1)-yl-(3) 3'-chloro-4'-methylanilide
Monobromoacetic N-butyn-(1)-yl-(3) 3'-methyl-4'-chloroanilide
Monochloroacetic N-butyn-(1)-yl-(3) 2'-chloro-4'-methylanilide
Monochloroacetic N-butyn-(1)-yl-(3) 2'-methyl-4'-chloroanilide
Monochloroacetic N-butyn-(1)-yl-(3) 3'-methyl-4'-fluoroanilide
Monochloroacetic N - butyn - (1)-yl-(3) 3'-fluoro-4'-isopropylanilide
Monochloroacetic N - butyn-(1)-yl-(3) 2'-methyl-4'-fluoroanilide
Monochloroacetic N-butyn-(1)-yl-(3) 2'-fluoro-4'-methylanilide
Monochloroacetic N-butyn-(1)-yl-(3) m-nitroanilide
Monochloroacetic N-cyanomethyl-3,4-dichloroanilide
Monochloroacetic N-thioacetamide-3,4-dichloroanilide
Monochloroacetic N-3',3'-dichloromethallylthioacetimido-3,4-dichloroanilide
Monochloroacetic N-β-hydroxypropylanilide
Monochloroacetic N - butyn - (1)-yl-(3) 3'4'-dithiocyanoanilide
Monochloroacetic N-butyn-(1)-yl-(3) 4'-chloro-3'-trifluoromethylanilide.

We claim:
1. A compound of the formula

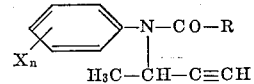

wherein X denotes a substituent selected from the class consisting of hydrogen, chloro, bromo, fluoro, and alkyl of 1 to 3 carbon atoms, n is an integer of 1 to 3 and R denotes a substituent selected from the class consisting of alkyl of 1 to 3 carbon atoms and chloro- and bromo-substituted alkyl of 1 to 3 carbon atoms.

2. Chloroacetic N-butyn-(1)-yl-(3) anilide.
3. Monochloroacetic N - butyn - (1) - yl-(3) p-chloroanilide.
4. Acetic N-butyn-(1)-yl-(3) m-chloroanilide.

References Cited

UNITED STATES PATENTS

| 2,338,380 | 1/1944 | Hester et al. | 260—562 |
| 2,809,984 | 10/1957 | Buc | 260—562 |
| 2,863,752 | 12/1958 | Hamm et al. | 260—562 |
| 3,016,383 | 1/1962 | Wright et al. | 260—562 |
| 3,038,938 | 6/1962 | Stevens | 260—562 |
| 3,247,206 | 4/1966 | Yost et al. | 260—465 |

FOREIGN PATENTS 1,378,964   10/1964   France.

HENRY R. JILES, Primary Examiner

H. I. MOATZ, Assistant Examiner

U.S. Cl. X.R.

71—118